(12) United States Patent  
Bremer et al.

(10) Patent No.: US 8,695,880 B2  
(45) Date of Patent: Apr. 15, 2014

(54) IMAGING DEVICES AND METHODS FOR INHIBITING OR REMOVING CAPTURED AIMING PATTERN

(75) Inventors: Edward C. Bremer, Victor, NY (US); Runhong Deng, Victor, NY (US)

(73) Assignee: Honeywell International, Inc., Fort Mill, SC (US)

( * ) Notice: Subject to any disclaimer, the term of this patent is extended or adjusted under 35 U.S.C. 154(b) by 0 days.

(21) Appl. No.: 13/334,472

(22) Filed: Dec. 22, 2011

(65) Prior Publication Data

US 2013/0161397 A1 Jun. 27, 2013

(51) Int. Cl.
 *G06K 7/10* (2006.01)
 *G06K 9/24* (2006.01)

(52) U.S. Cl.
 USPC .................................. 235/462.21; 235/462.42

(58) Field of Classification Search
 USPC ............. 235/462.21, 472.01, 462.11, 462.25, 235/462.46
 See application file for complete search history.

(56) References Cited

U.S. PATENT DOCUMENTS

| | | | |
|---|---|---|---|
| 5,382,783 A | 1/1995 | Bremer | |
| 6,474,816 B2 | 11/2002 | Butler et al. | |
| 6,877,661 B2 | 4/2005 | Webb et al. | |
| 7,021,534 B1 | 4/2006 | Kiiccote | |
| 7,054,660 B2 | 5/2006 | Lord | |
| 7,069,001 B2 | 6/2006 | Rupp et al. | |
| 7,072,854 B2 | 7/2006 | Loeser | |
| 7,203,158 B2 | 4/2007 | Oshima et al. | |
| 7,248,160 B2 | 7/2007 | Mangan et al. | |
| 7,358,955 B2 | 4/2008 | Lim | |
| 7,387,250 B2 | 6/2008 | Muni | |
| 7,552,867 B2 | 6/2009 | Waltman | |
| 7,577,462 B2 | 8/2009 | Kumar | |
| 7,693,744 B2 | 4/2010 | Forbes | |
| 7,699,227 B2 | 4/2010 | Wang et al. | |
| 7,739,190 B2 | 6/2010 | Shin et al. | |
| 7,740,168 B2 | 6/2010 | Hammad et al. | |
| 7,809,407 B2 | 10/2010 | Oshima et al. | |
| 7,810,720 B2 | 10/2010 | Lovett | |
| 7,822,688 B2 | 10/2010 | Labrou et al. | |
| 8,038,054 B2 | 10/2011 | Douma | |
| 2001/0003346 A1* | 6/2001 | Feng | 235/472.01 |
| 2002/0126780 A1 | 9/2002 | Oshima et al. | |
| 2003/0080189 A1* | 5/2003 | Patel et al. | 235/454 |
| 2007/0241195 A1 | 10/2007 | Hussey et al. | |
| 2007/0267501 A1 | 11/2007 | Jovanovski et al. | |
| 2008/0296393 A1 | 12/2008 | Jovanovski et al. | |
| 2009/0026267 A1 | 1/2009 | Wang et al. | |
| 2009/0072038 A1 | 3/2009 | Wang et al. | |

(Continued)

OTHER PUBLICATIONS

Van Volkinburg et al., U.S. Appl. No. 13/017,926, filed Jan. 31, 2011, entitled "Terminal With Flicker-Corrected Aimer and Alternating Illumination".

(Continued)

*Primary Examiner* — Edwyn Labaze
(74) *Attorney, Agent, or Firm* — Additon, Higgins, Pendleton & Ashe, P.A.

(57) ABSTRACT

A method for obtaining an image indicia includes performing one or more exposures of an imager to capture one or more images, and controlling active portions of an aiming pattern to inhibit capture of the aiming pattern in the one or more captured images or removing the aiming pattern from the one or more captured images. An attempted may be made to decode one or more decodable indicia utilizing the one or more captured images.

29 Claims, 9 Drawing Sheets

(56) References Cited

U.S. PATENT DOCUMENTS

| | | |
|---|---|---|
| 2009/0088203 A1 | 4/2009 | Havens et al. |
| 2009/0182634 A1 | 7/2009 | Park et al. |
| 2009/0240598 A1 | 9/2009 | Kargman et al. |
| 2010/0044436 A1 | 2/2010 | Powell et al. |
| 2010/0078477 A1 | 4/2010 | Wang et al. |
| 2010/0090007 A1 | 4/2010 | Wang et al. |
| 2010/0108769 A1 | 5/2010 | Wang et al. |
| 2010/0147956 A1 | 6/2010 | Wang et al. |
| 2010/0219234 A1 | 9/2010 | Forbes |
| 2011/0101102 A1* | 5/2011 | Hussey et al. ............ 235/470 |

OTHER PUBLICATIONS

Van Volkinburg et al., U.S. Appl. No. 12/957,971, filed Dec. 1, 2010, entitled "Terminal With Screen Reading Mode".

Jovanouski et al., U.S. Appl. No. 12/981,793, filed Dec. 30, 2010, entitled "Terminal Illumination and Exposure Control".

* cited by examiner

IMAGING DEVICES AND METHODS FOR INHIBITING OR REMOVING CAPTURED AIMING PATTERN

FIELD OF THE INVENTION

The present invention relates in general to imaging devices, and in particular, to imaging devices and methods for inhibiting or removing a captured aiming pattern such as for optical readers for use in decoding decodable indicia.

BACKGROUND OF THE INVENTION

It is known in the art of indicia reading terminals (e.g., bar code readers) to process a plurality of successively captured setup frames of image data prior to subjecting a captured frame of image data to a decode attempt.

To scan a barcode, a user aims the camera at the barcode and presses a button to activate barcode capture and decoding. To aid the user in aiming the reader, an aimer is often provided to provide a concentrated light source such as a concentrated laser pattern that projects from the indicia reading terminal. Typically, the indicia reading terminals also include an illumination light source that illuminates the barcode being read.

Conventional indicia reading terminals employ an output signal from the imager that is used to control activation of the illumination light source to illuminate the barcode being read. When this signal becomes active the illumination light source is activated and turns off when the signal becomes inactive. The signal is also used to control an aimer. When this signal becomes inactive the aimer is activated. Use of the single output signal to control both the illumination light source and the aimer results in the aimer pattern appearing in the captured image which effects the ability to decode barcode from being read.

Conventional indicia reading terminals also employ an image sensor with a global shutter for reducing motion blur artifacts in a captured image. The global shutter sensor includes a metal mask area in the pixels that covers a storage node capacitor. The storage node capacitor holds the pixel value until it can be read out of the sensor. However, the metal mask can leak and light can get onto the storage node capacitor during the read out time as the image frame is being read out of the sensor. When using a very bright laser aimer, the laser aimer can appear in the image due to the metal mask leaking the light from the laser aimer pattern into the storage node of the pixel.

There is a need for further imaging devices, and in particular, to imaging devices and methods for inhibiting or removing a captured aiming pattern such as for optical readers for use in decoding decodable indicia.

SUMMARY OF THE INVENTION

In a first aspect, the present invention provides an imaging device which include an aimer subsystem operative for projecting an aiming pattern, an imaging subsystem comprising an image sensor array and an imaging optics assembly operative for focusing an image onto the image sensor array, and wherein the imaging device is adapted to inhibit capture of or to remove the aiming pattern in one or more captured images.

In a second aspect, the present invention provides a method for obtaining an image. The method includes performing one or more exposures of an imager to capture one or more images, and controlling active portions of an aiming pattern to inhibit capture of the aiming pattern in the one or more captured images or removing the aiming pattern from the one or more captured images.

BRIEF DESCRIPTION OF THE DRAWINGS

The subject matter which is regarded as the invention is particularly pointed out and distinctly claimed in the concluding portion of the specification. The invention, however, may best be understood by reference to the following detailed description of various embodiments and to the accompanying drawings in which:

DETAILED DESCRIPTION OF THE INVENTION

As described in greater detail below, the present invention is directed to imaging devices such as optical readers or indicia reading terminals for use in reading decodable indicia in which in various aspects inhibit capture of an aiming pattern and/or remove a captured aiming pattern. In several aspects, the timing of the aimer is controlled relative to the capturing of the image or images. For example, the timing may be controlled by activating the aimer after a period of time (e.g., time greater than 0) following the capture of an image and deactivating the aimer (e.g., time greater than 0) before a subsequent capture of an image. In other examples, the timing may be controlled to activate the aimer between some of the captured images such as alternating active portions of an aimer pattern for every other captured image. In further examples, the timing may be controlled to activate the aimer after the center rows of the image are captured. The timing may be controlled by a separate dedicated timing controller for the aimer. In still other examples, image artifacts caused by the aiming pattern may be operably removed by a processor prior to decoding. In addition, while the description below is in reference to image devices such as indicia reading terminals, the present invention may be in the form of other image devices such as devices having a global shutter image sensor and a very bright aiming system, e.g., a laser, such as document readers or cameras used for machine vision.

Figure 1:
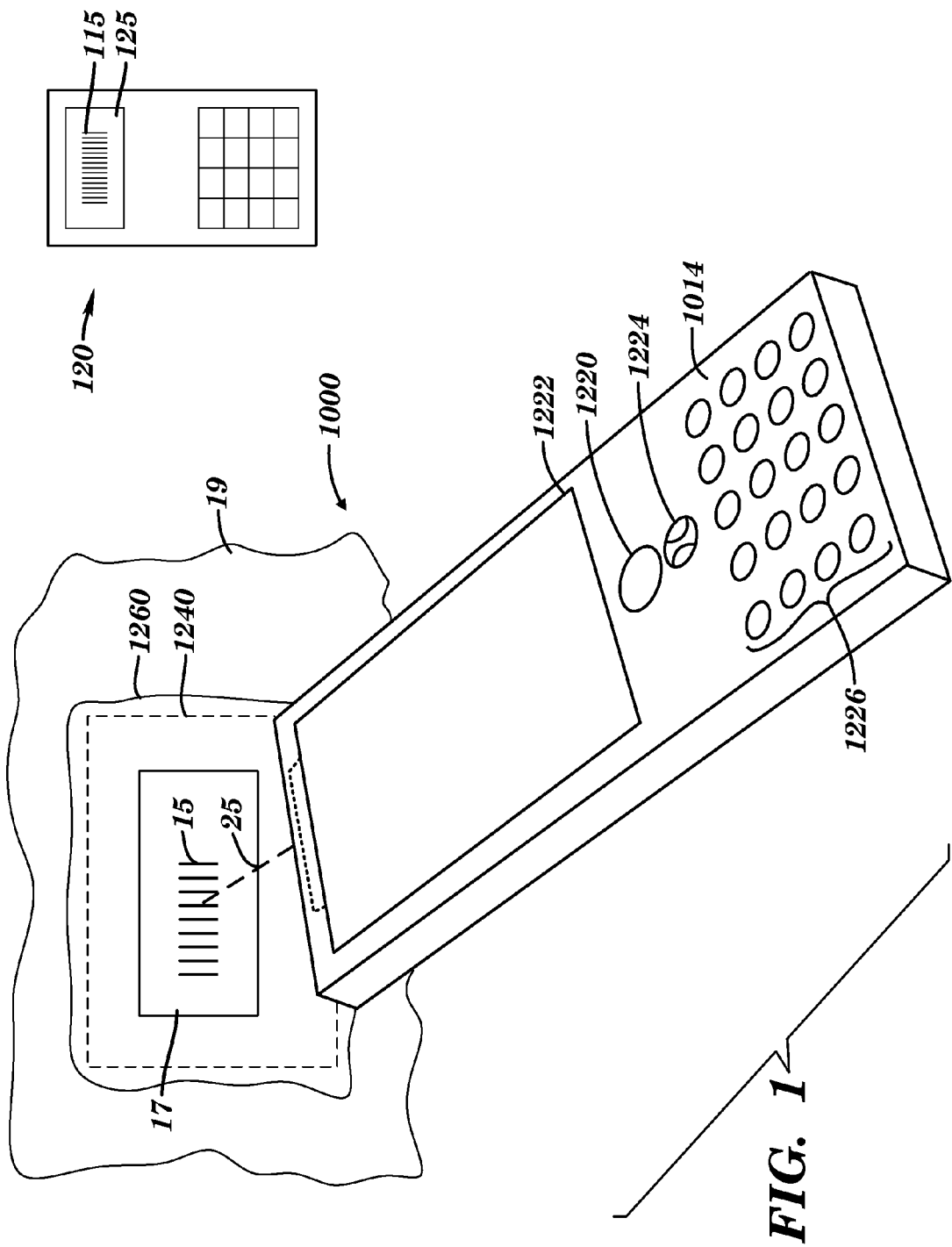
FIG. 1 is a schematic physical form view of one embodiment of an imaging device such as an indicia reading terminal in accordance with an aspect of the present invention.

FIG. 1 illustrates one embodiment of an imaging device such as an indicia reading terminal 1000 in accordance with an aspect of the present invention for use in reading decodable indicia and which is operable to inhibit capture of an aiming pattern and/or remove a captured aiming pattern. Indicia reading terminal 1000 may be operable for reading decodable indicia such as a barcode 15 disposed on a non-backlit substrate 17 such as paper, e.g., attached to a product 19, or device having an electronic paper display. Indicia reading terminal 1000 may also be operable for reading decodable indicia such as a barcode 115 displayed on an electronic device 120 such as a backlit screen 125, e.g., such as a display, monitor, LCD display, or other screen often employed in mobile phones, cell phones, satellite phones, smart phones, telemetric devices, personal data assistants, and other devices. While a single decodable indicia is illustrated as being read at a time, it will be appreciated that an image may be operable to capture one or more decodable indicia at the same time.

For example, terminal 1000 in one embodiment may include a trigger 1220, a display 1222, a pointer mechanism 1224, and a keyboard 1226 disposed on a common side of a hand held housing 1014. Display 1222 and pointer mechanism 1224 in combination can be regarded as a user interface of terminal 1000. Display 1222 in one embodiment can incorporate a touch panel for navigation and virtual actuator selection in which case a user interface of terminal 1000 can be provided by display 1222. Hand held housing 1014 of terminal 1000 can in another embodiment be devoid of a display and can be in a gun style form factor.

The following description uses nomenclature associated with indicia reading terminals and may generally include hand held indicia reading terminals, fixed indicia reading terminals, however those of ordinary skill in the art will recognize that the present invention is applicable to a variety of other devices having a light source and imager which may be configured as, for example, mobile phones, cell phones, satellite phones, smart phones, telemetric devices, personal data assistants, and other devices.

Figure 2:
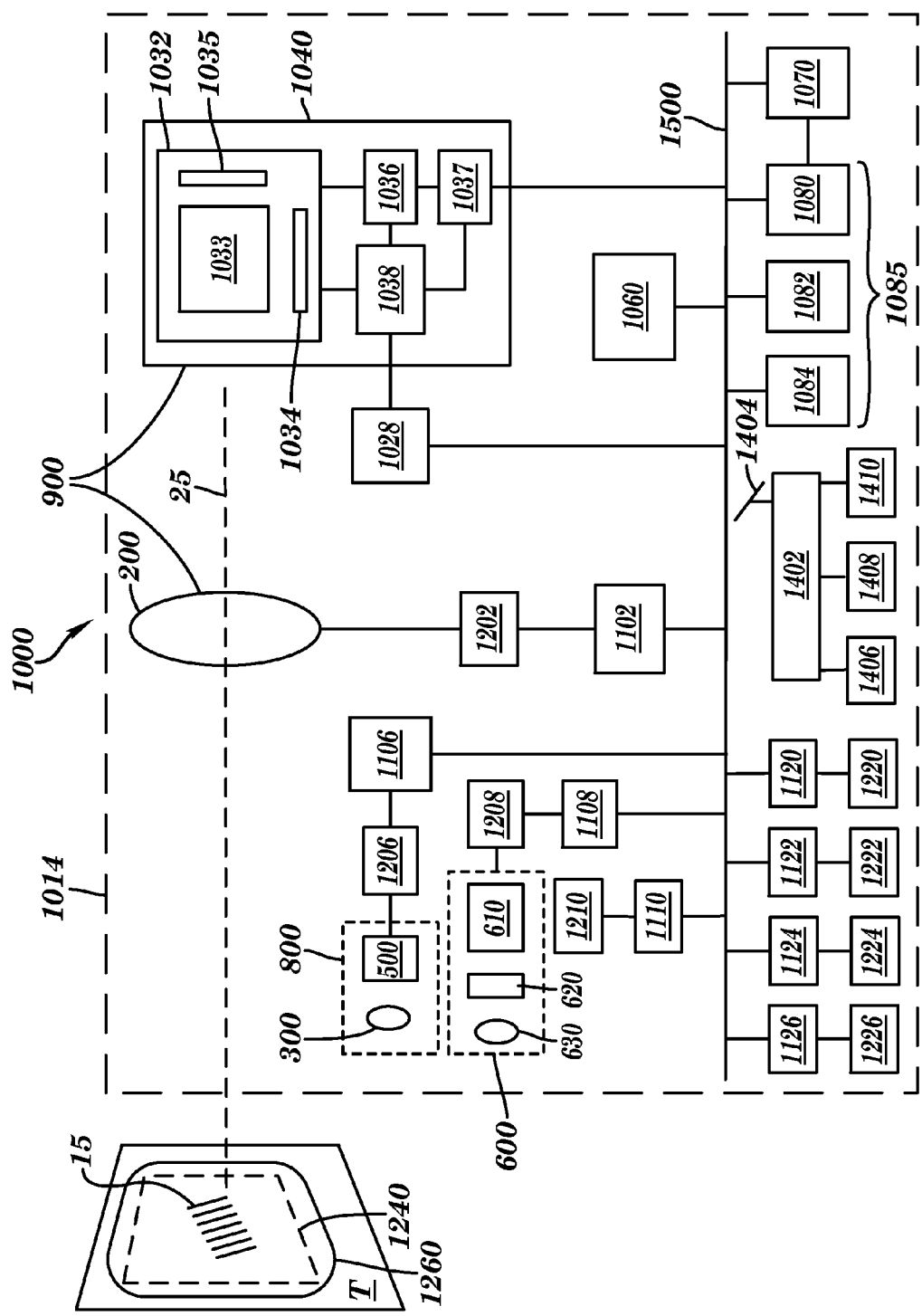
FIG. 2 is a block diagram of one embodiment of the indicia reading terminal of FIG. 1.

FIG. 2 depicts a block diagram of one embodiment of indicia reading terminal 1000. Generally, indicia reading terminal 1000 may include an illumination subsystem 800, an aimer subsystem 600, an imaging subsystem 900, hand held housing 1014, a memory 1085, and a processor 1060.

Figure 3:
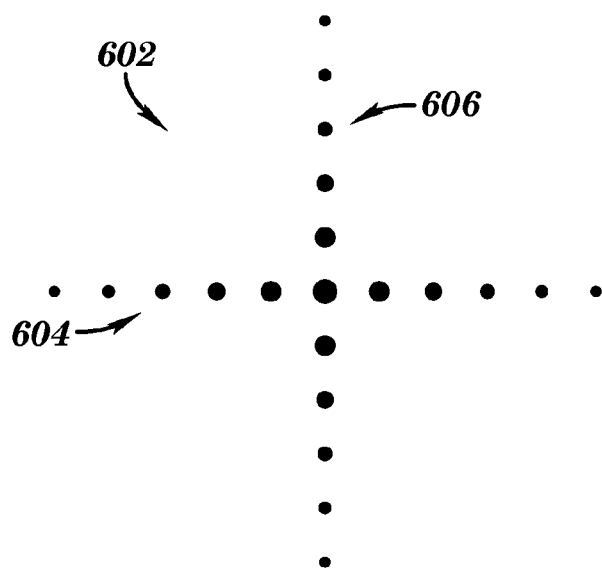
FIG. 3 is an illustrative view of one embodiment of an aiming pattern projectable by the indicia reading terminal of FIG. 1.

As shown in FIG. 3, aimer subsystem 600 (FIG. 2) may be operable for projecting an aiming pattern 602 such as an aiming pattern or aiming illumination pattern having a horizontal portion 604 and a vertical portion 606. It will be appreciated that the aiming pattern may have other suitable configurations.

With reference again to FIG. 2, for example, aimer subsystem 600 may be coupled to a power input unit 1208 that may be coupled to a system bus 1500 via interface 1108 for communication with processor 1060. Aimer subsystem 600 may include an aimer light source 610 and aimer optical elements 620 and 630. For example, aimer light source 610 may include one or more light emitting diodes (LEDs) and/or aiming lasers, while aimer optical elements may include one or more apertures 620, and one or more lenses 630, which may be a spherical lens, an aspheric lens, a cylindrical lens, or an anamorphic lens, for example. Aimer subsystem 600 projects light from aimer light source 610 through aperture 620 and optics 630 to provide an aiming pattern onto a target to assist a user in capturing an image of the target with an image sensor array 1033. The aimer light source 610 may project light forward into a hemispherical pattern, for example. The front surface of an LED light source may contain an integrated convex lens surface designed to reduce the angular divergence of the light leaving the LED. As much of this light as possible is directed through the aimer aperture 620 and directed to further pass through the aimer optics 630. The aimer optics 630 may be designed to create an image of the aimer aperture onto the indicia located in the target T. Aimer subsystem 600 may in another implementation include a laser and a laser collimator, for example.

Illumination subsystem 800 may be operable for projecting an illumination pattern 1260 (FIGS. 1 and 2) which may include the light source being turned on or off, or the light source being turned on, off, on, off, etc. Imaging subsystem 900 may include image sensor array 1033 and an imaging optics assembly 200 operative for focusing an image onto image sensor array 1033. Hand held housing 1014 may encapsulate aimer subsystem 600, illumination subsystem 800, and imaging subsystem 900, in this illustrative embodiment. Memory 1085 is capable of storing an image, in which the image data may represent light incident on image sensor array 1033. Processor 1060 is operative for addressing memory 1085 and processing the frames of image data, such as processing for attempting to decode decodable indicia represented in the image data.

By adapting the terminal so that, for example, capturing of the aimer pattern is inhibited when obtaining one or more images of a barcode, terminal 1000 may be rendered better suited for reading decodable indicia in an expanded range of operating environments. For example, if the decodable image is a non-backlit barcode on paper or electronic paper, a light source may be provided for illuminating the non-backlit barcode during imager exposure and wherein the active portions of the aiming pattern occurs after exposure has begun and ends before the next exposure begins, or is removed from the image exposure. If the decodable image is a backlit barcode having its own illumination, the image exposure of the backlit barcode occurs with the light source off and with the aiming pattern occurring after exposure has begun and ending before the next exposure begins, or is removed from the imager exposure.

Figure 4:
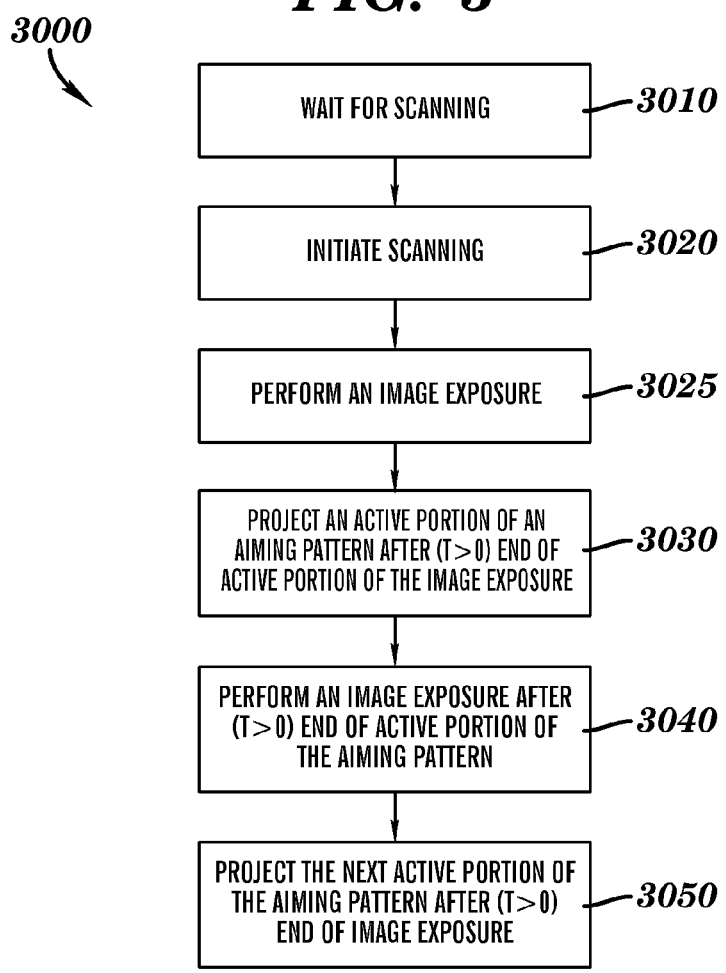
FIG. 4. is a flowchart illustrating one embodiment of a method operable for use in obtaining an image using the indicia reading terminal of FIG. 1.

FIG. 4 illustrates a flowchart of one embodiment of a method 3000 operable for use in obtaining an image in accordance with an aspect of the present invention. For example, method 3000 may be employed for obtaining an image of a non-backlit decodable indicia such as a barcode disposed on a non-backlit substrate, or employed for obtaining a backlit decodable indicia such as a barcode disposed on a display.

At 3010, terminal 1000 (FIG. 1) may wait for scanning to be initiated and at 3020, scanning may be initiated, e.g., by activation of a trigger signal via actuation of trigger 1220 (FIG. 1). A trigger signal can also be activated, e.g., via object detection, or a serial command from an external computer.

At 3025, an image exposure is performed. At 3030, a first active portion of an aiming pattern is projected after (T>0) the end of the active portion of the image exposure, e.g., the aimer subsystem 600 (FIG. 2) is energized to provide an active portion of an aiming pattern for use in aiding a user in aiming the indicia reading terminal at a decodable indicia. At 3040, an image exposure of the decodable indicia is performed after (T>0) the end of the first active portion of the aiming pattern, and ending prior to (T>0) the beginning of the next active portion of the aiming pattern. At 3050, the next active portion of the aiming patter is projected after (T>0) the end of the image exposure.

Figure 5:
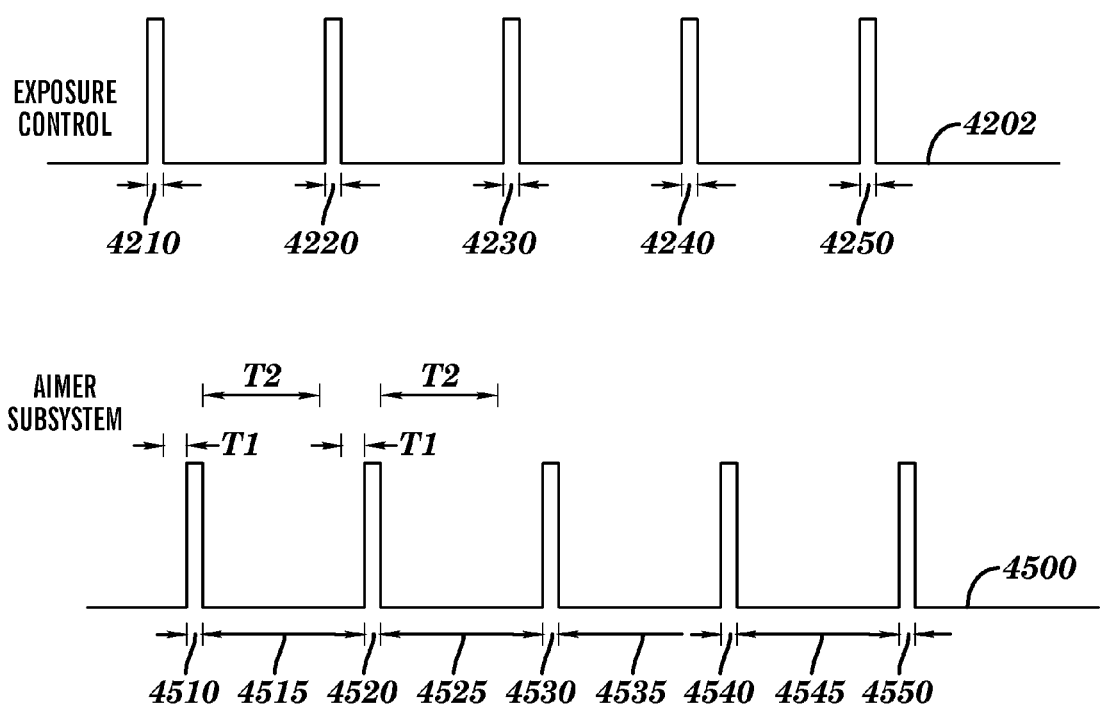
FIG. 5 is a timing diagram illustrating one embodiment operable for use in obtaining an image in connection with the method of FIG. 4.

FIG. 5 illustrates a timing diagram in connection with operation of the terminal 1000 (FIG. 1) operable for use during performance of the method indicated by the flowchart shown in FIG. 4. For example, a signal 4202 is an exposure control signal illustrating active states defining exposure periods and inactive states intermediate the exposure periods for the image sensor of the terminal. In an active state, an image sensor array of terminal 1000 (FIG. 1) is sensitive to light incident thereon. Exposure control signal 4202 can be applied to an image sensor array of terminal 1000 (FIG. 1) so that pixels of an image sensor array are sensitive to light during active periods of the exposure control signal and not sensitive to light during inactive periods thereof. During exposure periods 4210, 4220, 4230, 4240, and 4250, the image sensor array of terminal 1000 (FIG. 1) is sensitive to light incident thereon.

A signal 4500 illustrates aimer subsystem 600 (FIG. 2) having an energization level, e.g., illustrating an aiming pattern where the aiming pattern is alternatively turned on (active portion) and off (inactive portion). Periods, 4510, 4520, 4530, 4540, and 4550 illustrate where aimer illumination is on, and periods 4515, 4525, 4535, and 4545 illustrate where aimer illumination is off. In this exemplary embodiment shown in FIG. 5, the energization of the aimer subsystems, e.g., the beginning of the active portion of the aiming pattern, occurs at, e.g., a time T1, with the time being greater than 0, after the exposure period. In addition, the deenergization of the aimer subsystems, e.g., the ending of the active portion of the aiming pattern, occurs at, e.g., a time T2, with the time being greater than 0, before the next exposure period. The difference in timing inhibits the aimer illumination pattern from being captured by the imager when the imager is exposed. For example, T1 may be between about 25 microseconds to about 1 second, and typically between about 250 microseconds to about 2 milliseconds which may provide suitable motion tolerance and image brightness. As described below, the energization of the aimer subsystems may occur so that the aiming pattern may occur during the exposure period but after, for example, the center rows of the imager are read out.

Figure 6:
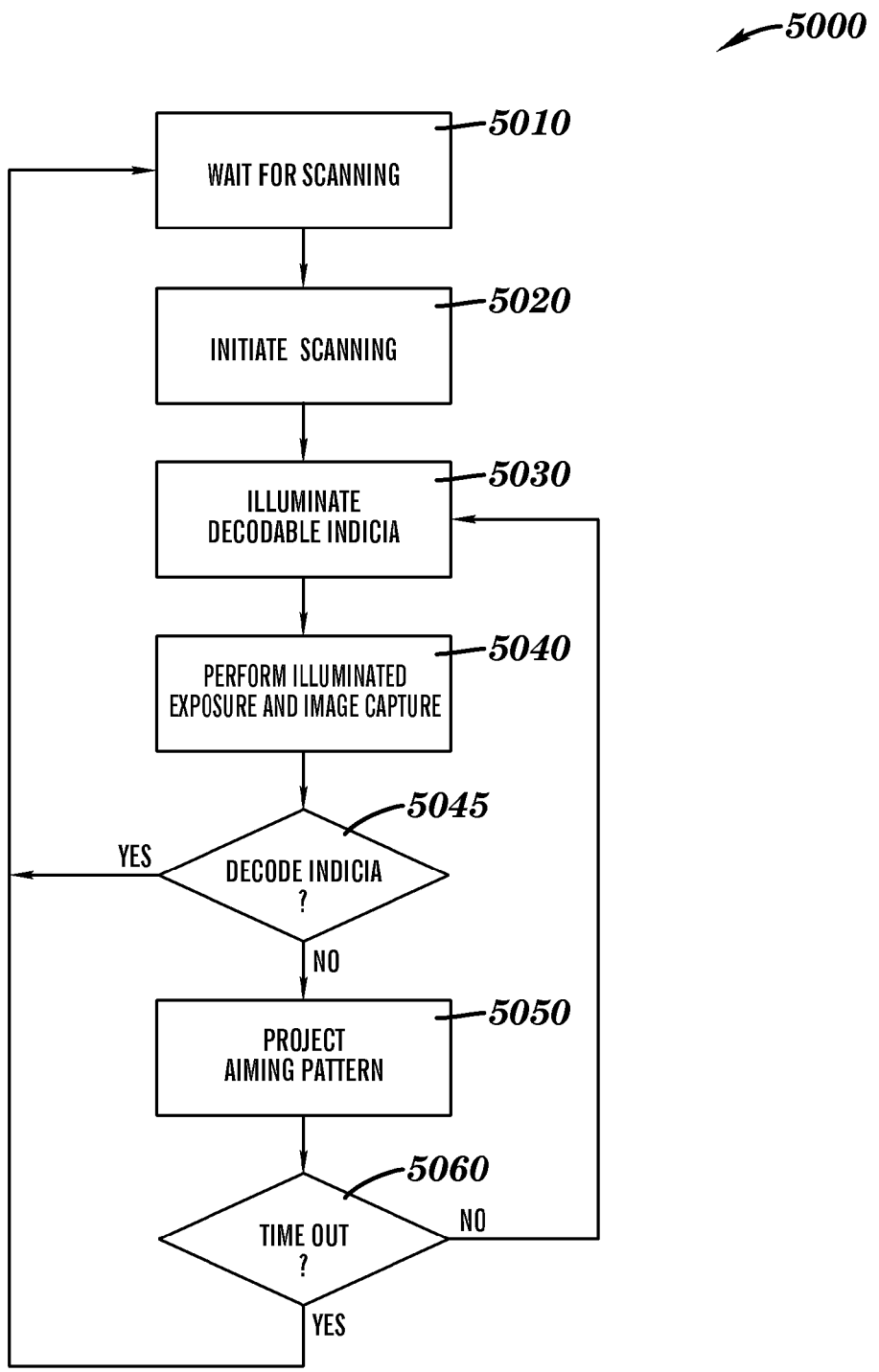
FIG. 6 is a flowchart illustrating an embodiment of a method for decoding a decodable indicia using the indicia reading terminal of FIG. 1.

FIG. 6 illustrates a flowchart of one embodiment of a method 5000 for decoding decodable indicia in accordance with an aspect of the present invention. For example, method 5000 may be employed for decoding a non-backlit decodable indicia such as a barcode disposed on a non-backlit substrate.

At 5010, terminal 1000 (FIGS. 1 and 2) may wait for scanning to be initiated, and at 5020, scanning may be initiated. At 5030, the illumination subsystem for illuminating the decodable indicia is turned on and an illuminated exposure and image capture is performed, at 5040.

At 5045, the imager exposure is read out and an attempted decode of the image data is performed. If decoding is successful, the process ends and terminal 1000 (FIG. 1) waits for the next scanning. If decoding fails, an aimer exposure is performed at 5050, for example, an active portion of the aiming pattern begins at a time (T>0) after the exposure period ends, and the active portion ends at a time (T>0) before the next exposure period begins. If a time out counter has not been reached at 5060, another illuminated exposure is performed, at 5040, and another attempted decode is performed at 5045. If the attempted decode is not successful and a time out counter has been reached, at 5060, terminal 1000 (FIG. 1) waits for the next scanning.

Figure 7:
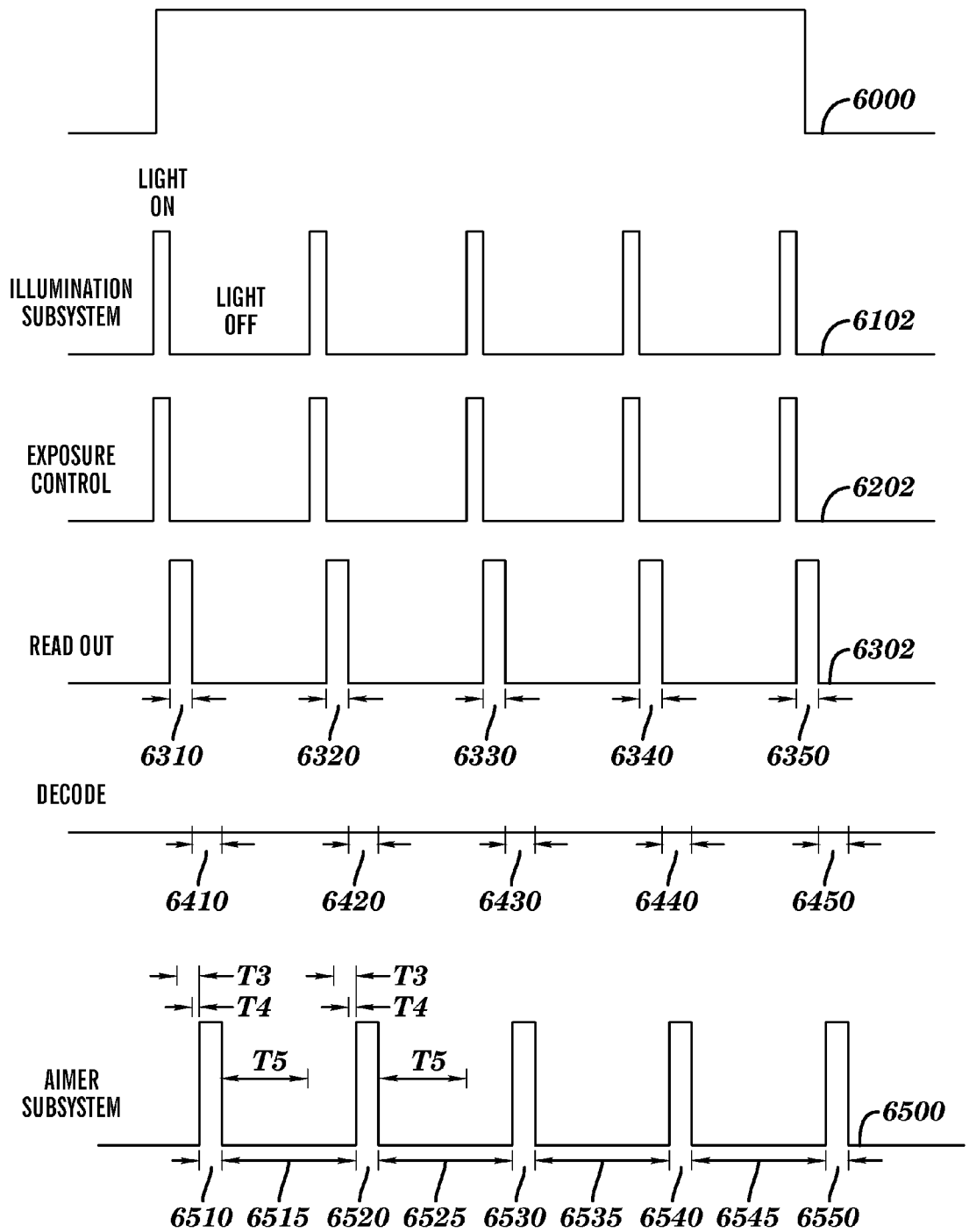
FIG. 7 is a timing diagram illustrating one embodiment operable for decoding a decodable indicia in connection with the method of FIG. 6.

FIG. 7 illustrates a timing diagram in connection with operation of the terminal 1000 (FIG. 1) during performance of a method such as indicated by the flowchart as shown in FIG. 6. For example, a signal 6000 is a trigger signal which can be made active by actuation of trigger 1220 (FIG. 1), and which can be deactivated by releasing of trigger 1220 (FIG. 1). A trigger signal may also become inactive after a time out period or after a successful decode of a decodable indicia. A signal 6102 illustrates illumination subsystem 800 (FIG. 2) where illumination or light is alternatively turned on and off, and a signal 6202 is an exposure control signal illustrating active states defining exposure periods and inactive states intermediate the exposure periods for the image sensor of the terminal.

A signal 6302 is a read out control signal illustrating the exposed pixels in the image sensor array being transferred to memory or secondary storage in the imager so that the imager may be operable to being ready for the next active portion of the exposure control signal. In the timing diagram of FIG. 7, periods 6310, 6320, 6330, 6340, 6350 are periods illustrating the exposed pixels in the image sensor array being transferred to memory or secondary storage in the imager. Processer 1060 (FIG. 2) can process one or more frames of image data. For example, periods 6410, 6420, 6430, 6440, and 6450 may correspond to one or more attempts to decode the decodable indicia.

A signal 6500 illustrates aimer subsystem 600 (FIG. 2) having an energization level, e.g., illustrating an illumination pattern where illumination being alternatively turned on (active portion) and off (inactive portion). Periods 6510, 6520, 6530, 6540, and 6550 illustrate where illumination is on (active portion), and periods 6515, 6525, 6535, and 6545 illustrate where illumination is off (inactive portion).

As observed in FIG. 7, for example, the energization of the aimer subsystem may occur at a time T3 after energization of the illumination subsystem 800 (FIG. 2). In addition, the energization of the aimer subsystems may occur at a time T4 after read out of an image frame data. In addition, the deenergization of the aimer subsystems, e.g., the ending of the active portion of the aiming pattern may occurs at, e.g., a time T5, with the time being greater than 0, before the beginning of the next exposure period. As explained above, this difference in timing inhibits the aimer pattern being captured and read when the imager is exposed during the illumination of the illumination subsystem.

Figure 8:
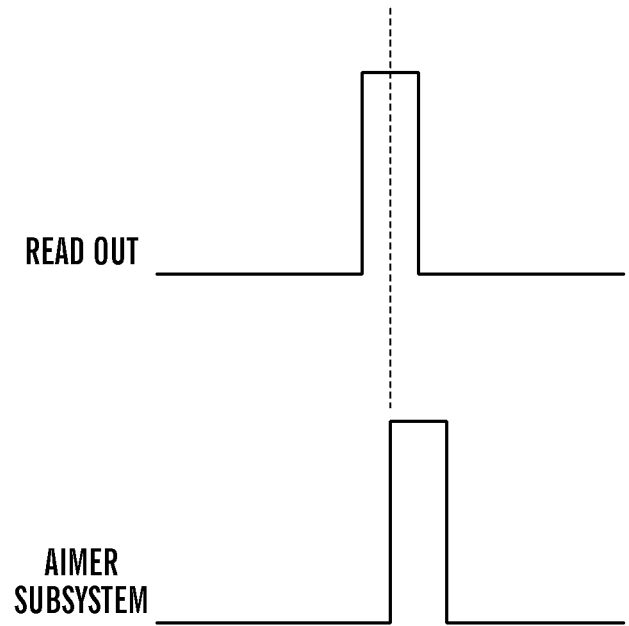
FIG. 8 is a timing diagram illustrating a portion of another embodiment for obtaining an image using the indicia reading terminal of FIG. 1.

From the present description, it will be appreciated that the timing of the aimer illumination may be controlled so that it is not turned on until after at least the center rows of the imager are read out as shown in FIG. 8, e.g., waiting until after the center rows are read out may inhibit reading the center rows with horizontal portion 604 (FIG. 3) of aiming pattern 602 (FIG. 3).

Figure 9:
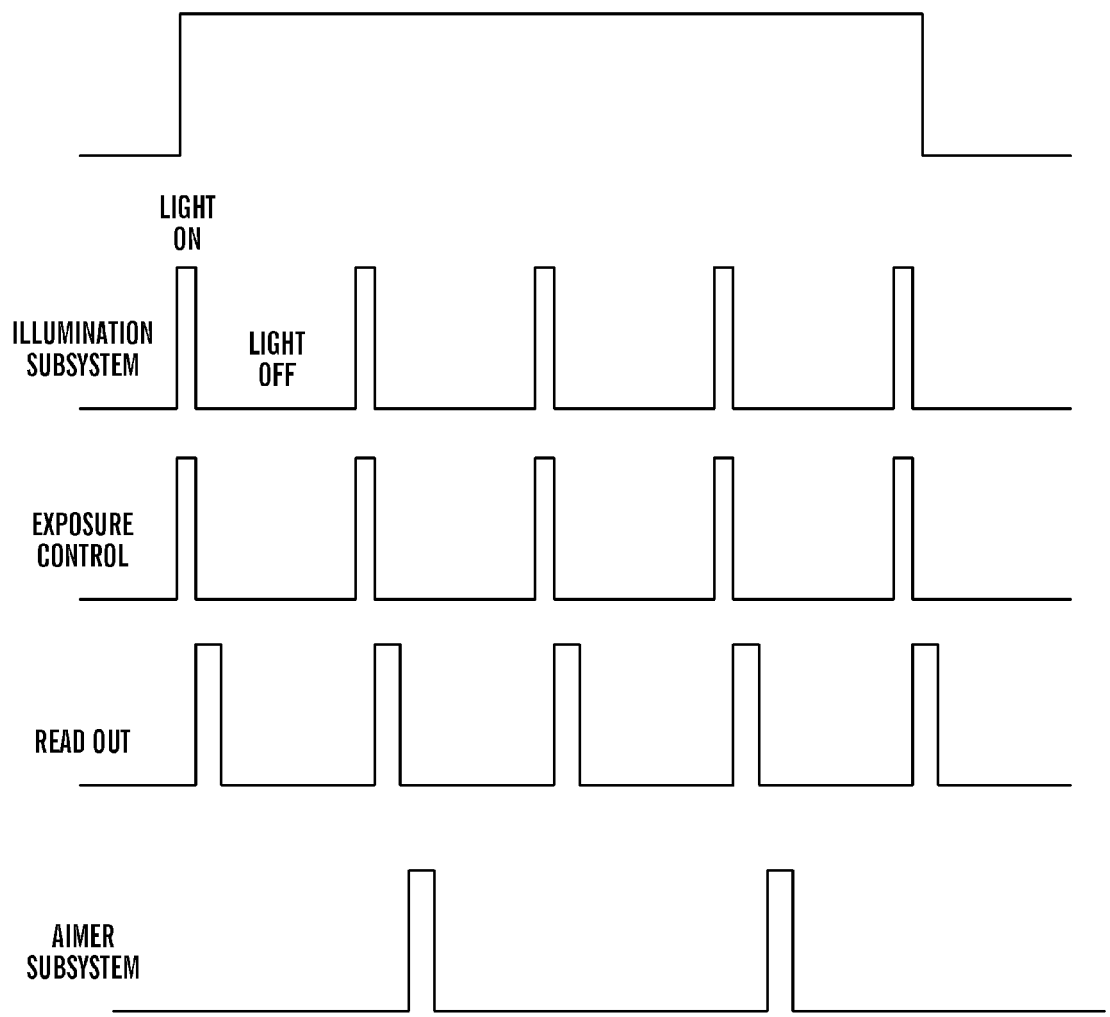
FIG. 9 is a timing diagram illustrating another embodiment for obtaining an image using the indicia reading terminal of FIG. 1.

FIG. 9 illustrates another timing diagram in connection with operation of terminal 1000 (FIG. 1). In this exemplary timing diagram, an imaging subsystem is activatable for a plurality of exposure periods to obtain a plurality of captured images, and the aiming subsystem is operable to not project an aiming pattern for each of the captured images. A plurality of aiming patterns illuminations may be staggered, e.g., being on for every other image frame rather than being on for every frame. It is appreciated that the active portions of the illuminated aiming pattern may occur at the same time as the active portions of the exposure control signal so that the aiming pattern will likely be captured in such captured images. However, the active portions of the exposure control signal where the aiming pattern is inactive will result in the captured image not capturing the aiming pattern and may likely provide a better captured image for decoding.

Figure 10:
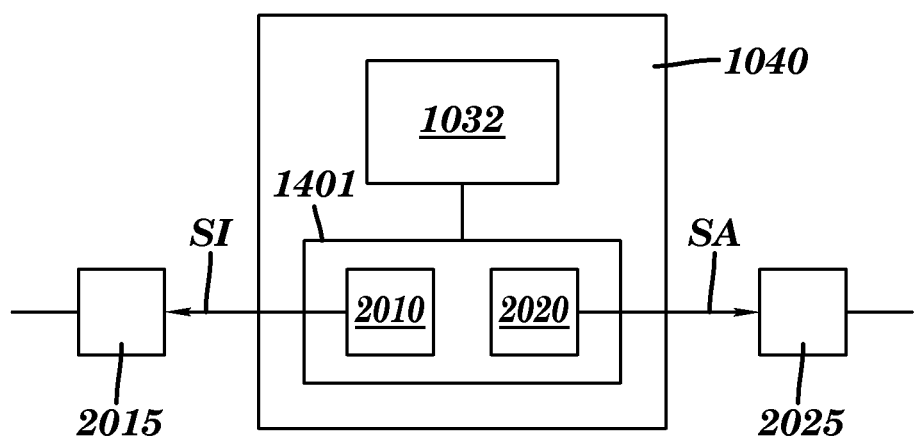
FIG. 10 is a block diagram of another embodiment of the image sensor integrated circuit for use in the indicia reading terminal of FIG. 1.

FIG. 10 illustrates image sensor integrated circuit 1040 which may include image sensor 1032 and a memory 1401.

Memory 1401 may be partitioned to include separate registers 2010 and 2020 for use in separately controlling the illumination subsystem 800 (FIG. 2) and the aimer subsystem 600 (FIG. 2), respectively. For example, register 2010 may provide a signal SI, based on exposure period, supplied to a timing circuit 2015 for use in controlling the timing of the illumination subsystem. Register 2020 may provide a signal SA, based on read out time, supplied to a timing circuit 2025 for use in controlling the timing of the aimer subsystem.

Another aspect of the present invention is directed to removing the capture of an aiming pattern that leaks through the shutter of the imager. Shutter efficiency effects occur during any time the storage node of the pixel is holding charge. This becomes an issue during read out. When the aimer subsystem is turned on, for example, the laser light may leak through into the storage node and can appear in the image if it is sufficiently brighter than the background. The image sensor may be configured so that the storage nodes are reset at the beginning of each frame. The storage nodes are also reset after each row is read out of the image sensor. The location of the laser aimer in the image may define the exposure period for the shutter leakage. Since the center of the aimer pattern is generally in the center of the image, the exposure time of the storage nodes, depending on the sensor used and the settings on the sensor, may be about 8 milliseconds.

Figure 11:
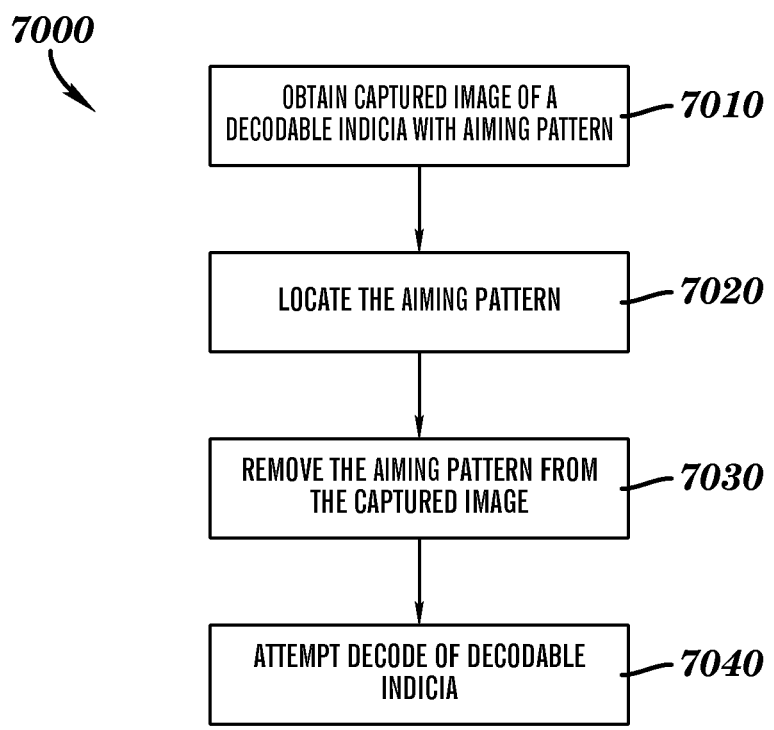
FIG. 11 is a flowchart illustrating an embodiment of a method for decoding a decodable indicia by removing the aiming pattern from a captured image using the indicia reading terminal of FIG. 1.

As shown in FIG. 11, a method 7000 may include obtaining a captured image of a decodable indicia with an aiming pattern at 7010. At 7020, the aiming pattern is located, and at 7030, the aiming pattern is removed from the captured image. At 7040, an attempt may be made to decode the decodable indicia without the aimer pattern.

For example, the removing of the aiming pattern may be implemented in software where the brighter portions of the captured images due the aiming pattern are adjusted. For example, the value of the brighter pixels may be adjusted or reduced based on the values of adjacent pixels. In other embodiments, a low pass filter may be employed, for example, in the center region of the captured image.

With reference again to FIG. 2, indicia reading terminal 1000 may include an image sensor 1032 comprising multiple pixel image sensor array 1033 having pixels arranged in rows and columns of pixels, associated column circuitry 1034 and row circuitry 1035. Associated with the image sensor 1032 can be amplifier circuitry 1036 (amplifier), and an analog to digital converter 1037 which converts image information in the form of analog signals read out of image sensor array 1033 into image information in the form of digital signals. Image sensor 1032 can also have an associated timing and control circuit 1038 for use in controlling, e.g., the exposure period of image sensor 1032, gain applied to the amplifier 1036, etc. The noted circuit components 1032, 1036, 1037, and 1038 can be packaged into a common image sensor integrated circuit 1040. Image sensor integrated circuit 1040 can incorporate fewer than the noted number of components. Image sensor integrated circuit 1040 including image sensor array 1033 and imaging lens assembly 200 can be incorporated in hand held housing 1014.

In one example, image sensor integrated circuit 1040 can be provided e.g., by an MT9V022 (752×480 pixel array) or an MT9V023 (752×480 pixel array) image sensor integrated circuit available from Aptina, Inc. In one example, image sensor array 1033 can be a hybrid monochrome and color image sensor array having a first subset of monochrome pixels without color filter elements and a second subset of color pixels having color sensitive filter elements. In one example, image sensor integrated circuit 1040 can incorporate a Bayer pattern filter, so that defined at the image sensor array 1033 are red pixels at red pixel positions, green pixels at green pixel positions, and blue pixels at blue pixel positions. Frames that are provided utilizing such an image sensor array incorporating a Bayer pattern can include red pixel values at red pixel positions, green pixel values at green pixel positions, and blue pixel values at blue pixel positions. In an embodiment incorporating a Bayer pattern image sensor array, processor 1060 prior to subjecting a frame to further processing can interpolate pixel values at frame pixel positions intermediate of green pixel positions utilizing green pixel values for development of a monochrome frame of image data. Alternatively, processor 1060 prior to subjecting a frame for further processing can interpolate pixel values intermediate of red pixel positions utilizing red pixel values for development of a monochrome frame of image data. Processor 1060 can alternatively, prior to subjecting a frame for further processing interpolate pixel values intermediate of blue pixel positions utilizing blue pixel values. An imaging subsystem of terminal 1000 can include image sensor 1032 and lens assembly 200 for focusing an image onto image sensor array 1033 of image sensor 1032.

In the course of operation of terminal 1000, image signals can be read out of image sensor 1032, converted, and stored into a system memory such as RAM 1080. Memory 1085 of terminal 1000 can include RAM 1080, a nonvolatile memory such as EPROM 1082 and a storage memory device 1084 such as may be provided by a flash memory or a hard drive memory. In one embodiment, terminal 1000 can include processor 1060 which can be adapted to read out image data stored in memory 1080 and subject such image data to various image processing algorithms. Terminal 1000 can include a direct memory access unit (DMA) 1070 for routing image information read out from image sensor 1032 that has been subject to conversion to RAM 1080. In another embodiment, terminal 1000 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 1032 and RAM 1080 are within the scope and the spirit of the invention.

With reference still to FIG. 2 and referring to further aspects of terminal 1000, imaging lens assembly 200 can be adapted for focusing an image of decodable indicia 15 located within a field of view 1240 (FIGS. 1 and 2) on a substrate or on a screen onto image sensor array 1033. A size in target space of field of view 1240 of terminal 1000 can be varied in a number of alternative ways. A size in target space of field of view 1240 can be varied, e.g., by changing a terminal to target distance, changing an imaging lens assembly setting, changing a number of pixels of image sensor array 1033 that are subject to read out. Imaging light rays can be transmitted about an imaging axis 25. Lens assembly 200 can be adapted to be capable of multiple focal lengths and multiple planes of optimum focus (best focus distances).

Terminal 1000 may include illumination subsystem 800 for illumination of target, and projection of illumination pattern 1260. Illumination pattern 1260, in the embodiment shown can be projected to be proximate to but larger than an area defined by field of view 1240, but can also be projected in an area smaller than an area defined by field of view 1240. Illumination subsystem 800 can include a light source bank 500, comprising one or more light sources. Light source assembly 800 may further include one or more light source banks, each comprising one or more light sources, for example. Such light sources can illustratively include light emitting diodes (LEDs), in an illustrative embodiment. LEDs with any of a wide variety of wavelengths and filters or combination of wavelengths or filters may be used in various embodiments. Other types of light sources may also be used in other embodiments. The light sources may illustratively be mounted to a printed circuit board. This may be the same printed circuit board on which an image sensor integrated circuit 1040 having an image sensor array 1033 may illustratively be mounted.

In one embodiment, illumination subsystem 800 may include, in addition to light source bank 500, an illumination lens assembly 300, as is shown in the embodiment of FIG. 2. In addition to or in place of illumination lens assembly 300, illumination subsystem 800 can include alternative light shaping optics, e.g. one or more diffusers, mirrors and prisms. In use, terminal 1000 can be oriented by an operator with respect to a target, (e.g., a piece of paper, a package, another type of substrate, screen, etc.) bearing decodable indicia 15 in such manner that illumination pattern 1260 is projected on decodable indicia 15. In the example of FIG. 2, decodable indicia 15 is provided by a 1D barcode symbol. Decodable indicia 15 could also be provided by a 2D barcode symbol or optical character recognition (OCR) characters. Referring to further aspects of terminal 1000, lens assembly 200 can be controlled with use of an electrical power input unit 1202 which provides energy for changing a plane of optimum focus of lens assembly 200. In one embodiment, electrical power input unit 1202 can operate as a controlled voltage source, and in another embodiment, as a controlled current source. Electrical power input unit 1202 can apply signals for changing optical characteristics of lens assembly 200, e.g., for changing a focal length and/or a best focus distance of (a plane of optimum focus of) lens assembly 200. A light source bank electrical power input unit 1206 can provide energy to light source bank 500. In one embodiment, electrical power input unit 1206 can operate as a controlled voltage source. In another embodiment, electrical power input unit 1206 can operate as a controlled current source. In another embodiment electrical power input unit 1206 can operate as a combined controlled voltage and controlled current source. Electrical power input unit 1206 can change a level of electrical power provided to (energization level of) light source bank 500, e.g., for changing a level of illumination output by light source bank 500 of illumination subsystem 800 for generating illumination pattern 1260.

In another aspect, terminal 1000 can include a power supply 1402 that supplies power to a power grid 1404 to which electrical components of terminal 1000 can be connected. Power supply 1402 can be coupled to various power sources, e.g., a battery 1406, a serial interface 1408 (e.g., USB, RS232), and/or AC/DC transformer 1410.

Further, regarding power input unit 1206, power input unit 1206 can include a charging capacitor that is continually charged by power supply 1402. Power input unit 1206 can be configured to output energy within a range of energization levels. An average energization level of illumination subsystem 800 during exposure periods with the first illumination and exposure control configuration active can be higher than an average energization level of illumination and exposure control configuration active.

Terminal 1000 can also include a number of peripheral devices including trigger 1220 which may be used to make active a trigger signal for activating frame read out and/or certain decoding processes. Terminal 1000 can be adapted so that activation of trigger 1220 activates a trigger signal and initiates a decode attempt. Specifically, terminal 1000 can be operative so that in response to activation of a trigger signal, a succession of frames can be captured by way of read out of image information from image sensor array 1033 (typically in the form of analog signals) and then storage of the image information after conversion into memory 1080 (which can buffer one or more of the succession of frames at a given time). Processor 1060 can be operative to subject one or more of the succession of frames to a decode attempt.

For attempting to decode a barcode symbol, e.g., a one dimensional barcode symbol, processor 1060 can process image data of a frame corresponding to a line of pixel positions (e.g., a row, a column, or a diagonal set of pixel positions) to determine a spatial pattern of dark and light cells and can convert each light and dark cell pattern determined into a character or character string via table lookup. Where a decodable indicia representation is a 2D barcode symbology, a decode attempt can comprise the steps of locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup.

Terminal 1000 can include various interface circuits for coupling various peripheral devices to system address/data bus (system bus) 1500, for communication with processor 1060 also coupled to system bus 1500. Terminal 1000 can include an interface circuit 1028 for coupling image sensor timing and control circuit 1038 to system bus 1500, an interface circuit 1102 for coupling electrical power input unit 1202 to system bus 1500, an interface circuit 1106 for coupling illumination light source bank power input unit 1206 to system bus 1500, and an interface circuit 1120 for coupling trigger 1220 to system bus 1500. Terminal 1000 can also include display 1222 coupled to system bus 1500 and in communication with processor 1060, via an interface 1122, as well as pointer mechanism 1224 in communication with processor 1060 via an interface 1124 connected to system bus 1500. Terminal 1000 can also include keyboard 1226 coupled to system bus 1500 and in communication with processor 1060 via an interface 1126. Terminal 1000 can also include range detector unit 1210 coupled to system bus 1500 via interface 1110. In one embodiment, range detector unit 1210 can be an acoustic range detector unit. Various interface circuits of terminal 1000 can share circuit components. For example, a common microcontroller can be established for providing control inputs to both image sensor timing and control circuit 1038 and to power input unit 1206. A common microcontroller providing control inputs to circuit 1038 and to power input unit 1206 can be provided to coordinate timing between image sensor array controls and illumination subsystem controls.

A succession of frames of image data that can be captured and subject to the described processing can be full frames (including pixel values corresponding to each pixel of image sensor array 1033 or a maximum number of pixels read out from image sensor array 1033 during operation of terminal 1000). A succession of frames of image data that can be captured and subject to the described processing can also be "windowed frames" comprising pixel values corresponding to less than a full frame of pixels of image sensor array 1033. A succession of frames of image data that can be captured and subject to the above described processing can also comprise a combination of full frames and windowed frames. A full frame can be read out for capture by selectively addressing pixels of image sensor 1032 having image sensor array 1033 corresponding to the full frame. A windowed frame can be read out for capture by selectively addressing pixels or ranges of pixels of image sensor 1032 having image sensor array 1033 corresponding to the windowed frame. In one embodiment, a number of pixels subject to addressing and read out determine a picture size of a frame. Accordingly, a full frame can be regarded as having a first relatively larger picture size and a windowed frame can be regarded as having a relatively smaller picture size relative to a picture size of a full frame. A picture size of a windowed frame can vary depending on the number of pixels subject to addressing and read out for capture of a windowed frame.

Terminal 1000 can capture frames of image data at a rate known as a frame rate. A typical frame rate is 60 frames per second (FPS) which translates to a frame time (frame period) of 16.6 ms. Another typical frame rate is 30 frames per second (FPS) which translates to a frame time (frame period) of 33.3 ms per frame. A frame rate of terminal 1000 can be increased (and frame time decreased) by decreasing of a frame picture size, increasing the pixel clock frequency, or charging output timing.

The image devices of the present invention may include a trigger signal that is activated, e.g., via object detection, a serial command from an external computer, optical sensor, magnet sensor, motion sensor (accelerometers), image sensor, etc.

A small sample of illustrative devices, systems, apparatuses, or methods are described herein as follows:

A1. An indicia reading terminal comprising:
   an aimer subsystem operative for projecting an aiming pattern;
   an imaging subsystem comprising an image sensor array and an imaging optics assembly operative for focusing an image onto the image sensor array;
   a housing incorporating said imaging subsystem and said aimer subsystem;
   wherein said indicia reading terminal is adapted to inhibit capture of or to remove the aiming pattern in one or more captured images; and
   wherein said indicia reading terminal is operable to attempt to decode one or more decodable indicia using the one or more images.

A2. The indicia reading terminal of claim A1 wherein said indicia reading terminal being adapted to inhibit capture of the aiming pattern in the one or more captured images comprises said indicia reading terminal being adapted so that an imager exposure for capturing one of the one or more captured images occurs non-simultaneously after an ending of and before a beginning of adjacent active portions of the aiming pattern.

A3. The indicia reading terminal of claim A1 wherein said indicia reading terminal being adapted to inhibit capture of the aiming pattern in the one or more captured images comprises said indicia reading terminal being adapted so that an active portion of the aiming pattern ends a time T1 prior to a beginning of an imager exposure for capturing one of the one or more captured images and so that the next active portion of the aiming pattern begins a time T2 after an ending of the imager exposure for capturing the one of the one or more captured images, and wherein T1 is greater than 0 and T2 is greater than 0.

A4. The indicia reading terminal of claim A1 wherein said indicia reading terminal being adapted to inhibit capture of the aiming pattern in the one or more captured images comprises said indicia reading terminal being adapted to begin an active portion of the aiming pattern upon read out of a center row of the image sensor of the one of the one or more captured images.

A5. The indicia reading terminal of claim A1 wherein said indicia reading terminal being adapted to inhibit capture of the aiming pattern in the one or more captured images comprises said indicia reading terminal being adapted to begin an active portion of the aiming pattern upon read out of one of the one or more captured images.

A7. The indicia reading terminal of claim A1 wherein said imaging subsystem is activatable for a plurality of exposure periods defining a plurality of frames for obtaining a plurality of captured images, and said indicia reading terminal is adapted to provide said aiming pattern comprising a plurality of active portions, and wherein active portions of the aiming pattern do not occur for some of the plurality of frames.

A8. The indicia reading terminal of claim A1 wherein said imaging subsystem is operable to provide a dedicated signal for use in separately controlling the aimer subsystem.

A9. The indicia reading terminal of claim A1 further comprising an image sensor integrated circuit comprising said image sensor, and said image sensor integrated circuit comprising memory providing a dedicated register for use in separately controlling the aimer subsystem.

A10. The indicia reading terminal of claim A1 wherein said indicia reading terminal is adapted to remove the aiming pattern in one of the one or more captured images prior attempting to decode a decodable indicia.

A11. The indicia reading terminal of claim A1 wherein said indicia reading terminal is operable to attempt to decode the decodable indicia comprising a barcode.

A12. The indicia reading terminal of claim A1 wherein said indicia reading terminal comprises a hand held indicia reading terminal.

A13. The indicia reading terminal of claim A1 further comprising an illumination subsystem operative for projecting an illumination pattern, said housing incorporating said illumination subsystem, and the one or more captured images comprise one or more illuminated captured images.

A14. The indicia reading terminal of claim A13 wherein said imaging subsystem is operable to provide a first signal for use in separately controlling said illumination subsystem, a second signal for use in separately controlling said aimer subsystem, and said first signal being different from said second signal.

A15. The indicia reading terminal of claim A13 further comprising an image sensor integrated circuit comprising said image sensor, and said image sensor integrated circuit comprising memory providing a first register for use in separately controlling said illumination subsystem and a second register for use in separately controlling said aimer subsystem.

A16. The indicia reading terminal of claim A13 wherein said indicia reading terminal being adapted to inhibit capture of the aiming pattern in one or more captured images comprises said indicia reading terminal being adapted so that an imager exposure for capturing one of the one or more captured images occurs non-simultaneously after an ending of and before a beginning of adjacent active portions of the aiming pattern.

A17. The indicia reading terminal of claim A13 wherein said indicia reading terminal being adapted to inhibit capture of the aiming pattern in one or more captured images comprises said indicia reading terminal being adapted so that an active portion of the aiming pattern ends a time T1 prior to a beginning of an imager exposure for capturing one of the one or more captured images and so that the next active portion of the aiming pattern begins a time T2 after an ending of the imager exposure for capturing one of the one or more captured images, and wherein T1 is greater than 0 and T2 is greater than 0.

A18. The indicia reading terminal of claim A13 wherein said indicia reading terminal being adapted to inhibit capture of the aiming pattern in one or more captured images comprises said indicia reading terminal being adapted to begin an active portion of the aiming pattern upon read out of a center row of the image sensor of one of the one or more captured images.

A19. The indicia reading terminal of claim A13 wherein said indicia reading terminal being adapted to inhibit capture of the aiming pattern in one or more captured images comprises said indicia reading terminal being adapted to begin an active portion of the aiming pattern upon read out one of the one or more captured images.

A20. The indicia reading terminal of claim A13 wherein said indicia reading terminal is adapted to remove the aiming pattern in one of the one or more illuminated captured images prior to attempting to decode a decodable indicia.

A21. The indicia reading terminal of claim A13 wherein said indicia reading terminal is operable to attempt to decode the decodable indicia comprising a barcode.

A22. The indicia reading terminal of claim A13 wherein said indicia reading terminal comprises a hand held indicia reading terminal.

A23. A method for decoding decodable indicia, the method comprising:
providing the indicia reading terminal of claim A1;
capturing one or more images without the aiming pattern or removing the aiming pattern from the one or more captured image; and
attempting to decode at least one decodable indicia using at least one of the one or more images.

A24. A method for decoding decodable indicia, the method comprising:
providing the indicia reading terminal of claim A13;
capturing one or more illuminated images without the aiming pattern or removing the aiming pattern from the one or more captured image; and
attempting to decode at least one decodable indicia using at least one of the one or more images.

A25. A method for decoding a decodable indicia, the method comprising:
performing one or more exposures of an imager to capture one or more images of the decodable indicia;
controlling active portions of an aiming pattern to inhibit capture of the aiming pattern in the one or more captured images or removing the aiming pattern from the one or more captured images; and
attempting to decode the decodable indicia utilizing the one or more images.

A26. The method of claim A25 wherein the controlling the active portions of the aiming pattern comprises controlling the active portions of the aiming pattern so that an imager exposure for capturing one of the one or more captured images occurs non-simultaneously after an ending and before a beginning of adjacent active portions of the aiming pattern.

A27. The method of claim A25 wherein the controlling the active portions of the aiming pattern comprises controlling the active portions of the aiming pattern so that an active portion of the aiming pattern ends a time T1 prior to a beginning of an imager exposure for capturing one of the one or more captured images and so that a next active portion of the aiming pattern begins a time T2 after an ending of the imager exposure for capturing one of the one or more captured images, and wherein T1 is greater than 0 and T2 is the greater than 0.

A28. The method of claim A25 wherein the controlling the active portions of the aiming pattern comprises controlling the active portions of a beginning of an active portion of the aiming pattern upon read out of a center row of the image sensor of one of the one or more captured images.

A29. The method of claim A25 wherein the controlling the active portions of the aiming pattern comprises controlling an active portion of a beginning of an active portion of the aiming pattern upon read out of one of the one or more captured images.

A30. The method of claim A25 wherein the controlling the active portions of the aiming pattern comprises controlling a plurality of active portions of the aiming pattern associated with a plurality of exposure periods defining a plurality of frames for obtaining a plurality of the captured images, and wherein active portions of the aiming pattern do not occur for some of the plurality of frames.

A31. The method of claim A25 wherein the controlling or removing comprises removing the aiming pattern from one of the one or more captured images.

A32. The method of claim A25 wherein said indicia reading terminal is operable to attempt to decode the decodable indicia comprising a barcode.

A33. The method of claim A25 further comprising controlling an illumination pattern to illuminate the decodable indicia, and the performing comprises performing the one or more exposures of the imager to capture one or more illuminated images of the decodable indicia.

A34. The method of claim A33 wherein the controlling the illumination pattern and the controlling the active portions of the aiming pattern are separately controlled.

A35. The method of claim A33 wherein the controlling the active portions of the aiming pattern comprises controlling the active portions of the aiming pattern so that an imager exposure for capturing one of the one or more illuminated captured images occurs non-simultaneously after an ending and before a beginning of adjacent active portions of the aiming pattern.

A36. The method of claim A33 wherein the controlling the active portions of the aiming pattern comprises controlling the active portions of the aiming pattern so that an active portion of the aiming pattern ends a time T1 prior to a beginning of an imager exposure for capturing one of the one or more illuminated captured images and so that a next active portion of the aiming pattern begins a time T2 after an ending of the imager exposure for capturing one of the one or more illuminated captured images, and wherein T1 is greater than 0 and T2 is greater than 0.

A37. The method of claim A33 wherein the controlling the active portions of the aiming pattern comprises controlling the active portions of a beginning of an active portion of the aiming pattern upon read out of a center row of the image sensor of one of the one or more illuminated captured images.

A38. The method of claim A33 wherein the controlling the active portions of the aiming pattern comprises controlling the active portions of a beginning of an active portion of the aiming pattern upon read out of one of the one or more illuminated captured images.

A39. The method of claim A33 wherein the controlling of the active portions of the aiming pattern comprises controlling a plurality of active portions of the aiming pattern associated with a plurality of exposure periods defining a plurality of frames for obtaining a plurality of the illuminated captured images, and wherein active portions of the aiming pattern do not occur for some of the plurality of frames.

A40. The method of claim A33 wherein the controlling or removing comprises removing the aiming pattern from the one or more illuminated captured images.

While the present invention has been described with reference to a number of specific embodiments, it will be appreciated by those skilled in the art that many changes and modifications may be made thereunto without departing from the spirit and scope of the invention. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

The invention claimed is:

1. An imaging device comprising:
    illumination subsystem operative for projecting an illumination pattern;
    an aimer subsystem operative for projecting an aiming pattern;
    an imaging subsystem comprising an image sensor array and an imaging optics assembly operative for focusing an image onto said image sensor array; and
    wherein said imaging device is adapted to inhibit capture of or to remove the aiming pattern in one or more captured images; and
    an image sensor integrated circuit comprising said image sensor array, and said image sensor integrated circuit operable to provide a first signal for use in controlling said illumination subsystem and said image sensor integrated circuit operable to provide a second separate signal for use in controlling said aimer subsystem, and wherein the first signal being different from the second signal.

2. The imaging device of claim 1 further comprising said imaging device being adapted to attempt to decode one or more decodable indicia using the one or more captured images.

3. The imaging device of claim 1 wherein said imaging device being adapted to inhibit capture of the aiming pattern in the one or more captured images comprises said imaging device being adapted so that an imager exposure for capturing the one of the one or more captured images occurs non-simultaneously after an ending of and before a beginning of adjacent active portions of the aiming pattern.

4. The imaging device of claim 1 wherein said imaging device being adapted to inhibit capture of the aiming pattern in the one or more captured images comprises said imaging device being adapted so that an active portion of the aiming pattern ends a time T1 prior to a beginning of an imager exposure for capturing one of the one or more captured images and so that the next active portion of the aiming pattern begins a time T2 after an ending of the imager exposure for capturing the one of the one or more captured images, and wherein T1 is greater than 0 and T2 is greater than O.

5. The imaging device of claim 1 wherein said imaging device being adapted to inhibit capture of the aiming pattern in the one or more captured images comprises said imaging device being adapted to begin an active portion of the aiming pattern upon read out of a center row of said image sensor array of one of the one or more captured images.

6. The imaging device of claim 1 wherein said imaging device being adapted to inhibit capture of the aiming pattern in the one or more captured images comprises said imaging device being adapted to begin an active portion of the aiming pattern upon read out of one of the one or more captured images.

7. The imaging device of claim 1 wherein said imaging subsystem is activatable for a plurality of exposure periods defining a plurality of frames for obtaining a plurality of captured images, and said imaging device is adapted to provide said aiming pattern comprising a plurality of active portions, and wherein active portions of the aiming pattern do not occur for some of the plurality of frames.

8. The imaging device of claim 1 wherein said image sensor integrated circuit comprises memory providing a dedicated register for use in separately controlling said aimer subsystem.

9. The imaging device of claim 1 wherein said imaging device being adapted to remove the aiming pattern in one of the one or more captured images.

10. The imaging device of claim 1 further comprising a housing incorporating said imaging subsystem and said aimer subsystem, and wherein said imaging device comprises a hand held imaging device.

11. The imaging device of claim 1 wherein the one or more captured images comprise one or more illuminated captured images.

12. The imaging device of claim 1 wherein said image sensor integrated circuit comprises memory providing a first register for providing the first signal for use in controlling said illumination subsystem, and a second register for providing the second signal for use in separately controlling said aimer subsystem.

13. A method for obtaining an image, the method comprising:
    performing one or more exposures of an imager to capture one or more images;
    controlling an illumination pattern;
    controlling active portions of an aiming pattern to inhibit capture of the aiming pattern in the one or more captured images or to remove the aiming pattern from the one or more captured images; and
    wherein the controlling the illumination pattern is based on a first signal from an image sensor integrated circuit, and the controlling active portions of the aiming pattern is based on a second separate signal from the image sensor integrated circuit, the first signal being different from the second signal.

14. The method of claim 13 further comprising attempting to decode one or more decodable indicia utilizing the one or more captured images.

15. The method of claim 13 wherein the controlling the active portions of the aiming pattern comprises controlling the active portions of the aiming pattern so that an imager exposure for capturing one of the one or more captured images occurs non-simultaneously after an ending and before a beginning of adjacent active portions of the aiming pattern.

16. The method of claim 13 wherein the controlling the active portions of the aiming pattern comprises controlling the active portions of the aiming pattern so that an active portion of the aiming pattern ends a time T1 prior to a beginning of an imager exposure for capturing one of the one or more captured images and so that a next active portion of the aiming pattern begins a time T2 after an ending of the imager exposure for capturing the one of the one or more captured images, and wherein T1 is greater than 0 and T2 is the greater than O.

17. The method of claim 13 wherein the controlling the active portions of the aiming pattern comprises controlling a beginning of an active portion of the aiming pattern upon read out of a center row of the image sensor array of one of the one or more captured images.

18. The method of claim 13 wherein the controlling the active portions of the aiming pattern comprises controlling a beginning of an active portion of the aiming pattern upon read out of one of the one or more captured images.

19. The method of claim 13 wherein the controlling of the active portions of the aiming pattern comprises controlling a plurality of active portions of the aiming pattern associated with a plurality of exposure periods defining a plurality of frames for obtaining a plurality of the captured images, and wherein the active portions of the aiming pattern do not occur for some of the plurality of frames.

20. The method of claim 13 wherein the controlling or removing comprises removing the aiming pattern from the one or more captured images.

21. The method of claim 13 wherein the performing comprises performing the one or more exposures of the imager to capture one or more illuminated images.

22. The method of claim 13 wherein the image sensor integrated circuit comprises memory providing a first register for providing the first signal for use in controlling the illumination pattern, and a second register for providing the second signal for use in separately controlling said aimer pattern.

23. The method of claim 13 wherein the controlling of the active portions of the aiming pattern comprises controlling a plurality of active portion of the aiming pattern associated with a plurality of exposure periods defining a plurality of frames for obtaining a plurality of illuminated captured images, and wherein active portions of the aiming pattern do not occur for some of the plurality of frames.

24. An imaging device comprising:
an aimer subsystem operative for projecting an aiming pattern;
an imaging subsystem comprising an image sensor array and an imaging optics assembly operative for focusing an image onto said image sensor array; and
an image sensor integrated circuit comprising said image sensor array, and said image sensor integrated circuit operable to provide a first signal for use in controlling said illumination subsystem and said image sensor integrated circuit operable to provide a second separate signal for use in controlling said aimer subsystem, and wherein the first signal being different from the second signal;
wherein said imaging device is adapted to remove the aiming pattern from one or more captured images and to adjust the value of pixels from one or more captured images having the aiming pattern.

25. The imaging device of claim 24 wherein said imaging device adapted to adjust the value of pixels from one or more captured images having the aiming pattern comprises said imaging device adapted to adjust the values of the pixels in a center region from one or more captured images having the aiming pattern.

26. The imaging device of claim 24 further comprising said imaging device being adapted to attempt to decode one or more decodable indicia using the one or more captured images having the aiming pattern removed.

27. A method for obtaining an image, the method comprising:
providing an image sensor integrated circuit comprising an image sensor array and an image sensor integrated circuit operable to provide a first signal for use in controlling an illumination subsystem and a second separate signal for use in controlling an aimer subsystem, the first signal being different from the second signal;
performing one or more exposures of an imager to capture one or more images having an aiming pattern; and
removing the aiming pattern from the one or more captured images;
wherein the removing the aiming pattern from one or more captured images comprises adjusting the value of pixels from one or more captured images having the aiming pattern.

28. The method of claim 27 wherein the adjusting the value of pixels from one or more captured images having the aiming pattern comprises adjusting the values of the pixels in a center region from one or more captured images having the aiming pattern.

29. The method of claim 27 further comprising attempting to decode one or more decodable indicia utilizing the one or more captured images having the aiming pattern removed.

* * * * *